United States Patent [19]

Dickens et al.

[11] Patent Number: 5,227,597
[45] Date of Patent: Jul. 13, 1993

[54] RAPID HEATING, UNIFORM, HIGHLY EFFICIENT GRIDDLE

[75] Inventors: David M. Dickens, Sunnyvale; James M. Taylor, Mountain View; Fern Mandelbaum, Menlo Park; Frank A. Doljack, Pleasanton, all of Calif.

[73] Assignee: Electric Power Research Institute, Palo Alto, Calif.

[21] Appl. No.: 745,843

[22] Filed: Aug. 16, 1991

Related U.S. Application Data

[63] Continuation-in-part of Ser. No. 480,895, Feb. 16, 1990, Pat. No. 5,134,265.

[51] Int. Cl.$^5$ .............................................. H05B 6/12
[52] U.S. Cl. ................... 219/10.493; 219/10.41; 219/10.491; 219/10.67; 219/10.75; 219/10.77; 219/10.79; 99/DIG. 14; 99/451
[58] Field of Search ................ 219/10.493, 10.491, 219/10.41, 10.43, 10.75, 10.79, 10.77, 553, 415, 10.67; 29/196.2, 196.3; 99/DIG. 14, 451; 126/390, 400; 428/450, 653, 676

[56] References Cited

U.S. PATENT DOCUMENTS

| | | | |
|---|---|---|---|
| 2,841,137 | 7/1958 | Chace | 126/390 |
| 3,684,853 | 8/1972 | Welch et al. | 219/10.49 |
| 3,836,744 | 9/1974 | Taketo et al. | 219/10.491 |
| 3,843,857 | 10/1974 | Cunningham | 219/10.49 |
| 3,898,410 | 8/1975 | Peters, Jr. | 219/10.49 |
| 3,906,181 | 9/1975 | Hibino et al. | 219/10.49 |
| 3,928,744 | 12/1975 | Hibino et al. | 219/10.49 |
| 3,966,426 | 6/1976 | McCoy et al. | 219/10.49 |
| 3,971,361 | 7/1976 | Hurko | 126/390 |
| 4,074,101 | 2/1978 | Kiuchi et al. | 219/10.49 |
| 4,256,945 | 3/1981 | Carter et al. | 219/10.75 |
| 4,277,667 | 7/1981 | Kiuchi | 219/10.77 |
| 4,296,295 | 10/1981 | Kiuchi | 219/10.49 |
| 4,348,571 | 9/1982 | Dills | 219/10.49 |
| 4,556,773 | 12/1985 | Yoshiyuki et al. | 219/10.55 C |
| 4,629,843 | 12/1986 | Kato et al. | 219/10.49 |
| 4,646,935 | 3/1987 | Ulam | 219/10.79 |
| 4,695,713 | 9/1987 | Krumme | 219/553 |
| 4,701,587 | 10/1987 | Carter et al. | 219/10.75 |
| 4,705,727 | 11/1987 | Hunter | 428/653 |
| 4,752,673 | 6/1988 | Krumme | 219/10.41 |
| 4,833,288 | 5/1989 | Poumey | 219/10.493 |
| 4,922,079 | 5/1990 | Bowen et al. | 219/415 |
| 5,134,265 | 7/1992 | Dickens et al. | 219/10.491 |

FOREIGN PATENT DOCUMENTS

| | | |
|---|---|---|
| 2453627 | 10/1979 | France . |
| 2527916 | 9/1983 | France . |
| 61-16615 | 1/1986 | Japan . |
| 63-286336 | 5/1987 | Japan . |
| 63-172639 | 7/1988 | Japan . |
| 1157711 | 7/1969 | United Kingdom . |
| 2015309 | 5/1979 | United Kingdom . |

OTHER PUBLICATIONS

"The Maxim Warming Tray", (1985).
"All-Clad Metalcrafters Brochure".

Primary Examiner—Bruce A. Reynolds
Assistant Examiner—Tu Hoang
Attorney, Agent, or Firm—Burns, Doane, Swecker & Mathis

[57] ABSTRACT

A fast heating, highly efficient griddle with interchangeable griddle plates including magnetically permeable materials having Curie temperatures which may be the same or different to provide different cooking temperatures is provided. The plates are formed as a balanced composite structure which mitigates bending when the magnetically permeable materials are heated to their Curie temperatures. Induction coils provide sufficient energy to heat the plates to their effective Curie temperatures in the presence of loads and maintain a uniform cooking temperature across the griddle plate to within less than one inch of the plate edges. The plates may be placed in an enhanced idle condition at cooking temperature by placing a cover over the plates or region of a plate not in use. Increased efficiency is achieved due to an insulator blanket placed between the griddle plates and coils.

20 Claims, 5 Drawing Sheets

RAPID HEATING, UNIFORM, HIGHLY EFFICIENT GRIDDLE

This application is a Continuation-In-Part of U.S. application Ser. No. 07/480,895, filed Feb. 16, 1990, U.S. Pat. No. 5,134,265.

TECHNICAL FIELD

The present invention relates generally to commercial griddle systems and more particularly to griddles employing magnetically permeable, tri-clad griddle plates heated by induction coils to their Curie temperature.

BACKGROUND OF THE INVENTION

Griddles are a major cooking appliance in commercial kitchens, particularly fast food and full-service chain restaurants. Typical prior art griddles are powered by either gas or electricity and typically have one heating element, one thermocouple and one thermostat per linear foot to permit wide temperature variations between heating elements. Power is literally pushed into the food.

The problems with the prior art griddles are numerous. Such griddles typically have a 70° F. temperature variation across their surfaces. Further, they cannot deliver power to specific incremental areas. Thus, cold areas may call for heat, resulting in hot areas becoming overheated, or vice versa. The heat-up time from the point of turn-on is typically 20 minutes, and the griddles have a slow response time to changes in temperatures caused by a change of load. Such griddles are difficult to clean since the relatively large surface areas cannot be removed for cleaning. Further, conventional griddles do not provide cooking temperatures within three inches of their peripheries.

There are also prior art consumer oriented induction cooking stoves with special pots. For example, French Patent No. 2,527,916 discloses a pot or pan with a ferromagnetic bottom. Several different pots can be provided with a ferromagnetic bottom of different Curie temperatures whereby different cooking temperatures can be achieved. The pots have ferromagnetic bottoms, and the stove has induction coils. These devices have coils that do not provide uniform temperature across the bottom of the pot or pan and provide minimum shielding of RF radiation. Such coils are not designed for use in plate technology or for large size pots.

SUMMARY OF THE INVENTION

The present invention is directed to a hot griddle system wherein griddle plates are quickly heated to a uniform, essentially constant temperature across their surfaces. Interchangeable griddle plates are used to provide different fixed cooking temperatures. Alternately, a single griddle plate can be used to provide at least two different cooking temperatures.

In accordance with the present invention, a griddle plate is provided which includes magnetically permeable material (i.e., high $\mu$ material) such as Alloy 34, Alloy 36 or the like. These high $\mu$ materials are subjected to an essentially uniform alternating magnetic field generated by induction coils to heat the griddle plates to their effective Curie temperatures. Once raised to their Curie temperatures, the plates become essentially non-magnetic, and heating is materially reduced. As the plate temperature decreases, the plates reacquire their magnetic properties and start heating again. Thus, the plates maintain a relatively constant temperature at about their effective Curie temperatures.

In a preferred embodiment, a multi-layer, composite griddle plate is used to provide the relatively constant surface temperature described above. Layers of different material (i.e., materials having different Young's modulus, Poisson ratio and coefficient of thermal expansion (CTE)) are used to form the griddle plate. The griddle plate has a relatively large surface area and, to facilitate removal, is not fastened to a support upon which it rests. Accordingly, bending of the composite plate during heating is a significant concern. To minimize bending of the composite griddle plate, the material used to form each layer is selected on the basis of its CTE. Further, the thickness of each layer is selected such that the plate deflection remains at or near zero during temperature cycling.

Uniformity of temperature across the plate is insured through use of a specific design of the induction coils and plate structure. The magnetic field across the griddle plate is maintained such that each region of the plate responds uniformly to a change in load at that region. In a preferred embodiment, measurements of temperature across the plate vary by about ±10° F. These small variations result from the incremental plate response to changes in the load.

For example, if cool batter is placed on an area of a plate, the temperature of that area on the plate is reduced. The area therefore becomes highly magnetic and generates heat at a fast rate, whereas immediately adjacent areas are unaffected by changes in load and continue to idle (i.e., cycle over a short range about the effective Curie temperature).

In one aspect of this invention, there is provided a system for providing a surface adapted to be heated to a predetermined temperature for cooking food, comprising an induction coil for generating a magnetic field; and a planar griddle plate positioned adjacent the induction coil. The griddle plate further includes first and second layers, at least one of said layers being formed of magnetically permeable material having a particular Curie temperature, said first and second layers having predetermined coefficients of thermal expansion; and a third layer of material placed between said first and second layers and having a coefficient of thermal expansion substantially higher than said predetermined coefficients of thermal expansion of the first and second layers, said first, second and third layers having relative thicknesses which maintain said griddle plate planar during heating of said magnetically permeable material to its Curie temperature.

In another aspect, there is provided a three-layer composite griddle plate for use as a planar cooking surface comprising first and second planar layers, at least one of said first and second layers being formed of a magnetically permeable material having a Curie temperature, said first and second layers having predetermined coefficients of thermal expansion; and a third layer located between said first and second layers, said third layer formed of a material having a coefficient of thermal expansion different from said predetermined coefficients of thermal expansion of said first and second layers, each of said first, second and third layers having relative thicknesses selected to prevent the composite griddle plate from bending when said first layer is heated to its Curie temperature.

In yet another aspect, there is provided a method for fabricating a three-layer composite griddle plate for use as a planar cooking surface comprising the steps of: selecting at least one magnetically permeable material having a Curie temperature for use as at least one of a first and second layer of the planar griddle plate, said first and second layers having predetermined coefficients of thermal expansion; selecting another material for use as a third layer located between said first and second layers of the planar griddle plate, said another material having a coefficient of thermal expansion different from said predetermined coefficients of thermal expansion of said first and second layers; and selecting relative thicknesses of said first, second and third layers which prevent said composite griddle plate from bending when said first layer is heated to its Curie temperature.

DETAILED DESCRIPTION OF THE PREFERRED EMBODIMENTS

Figure 1:
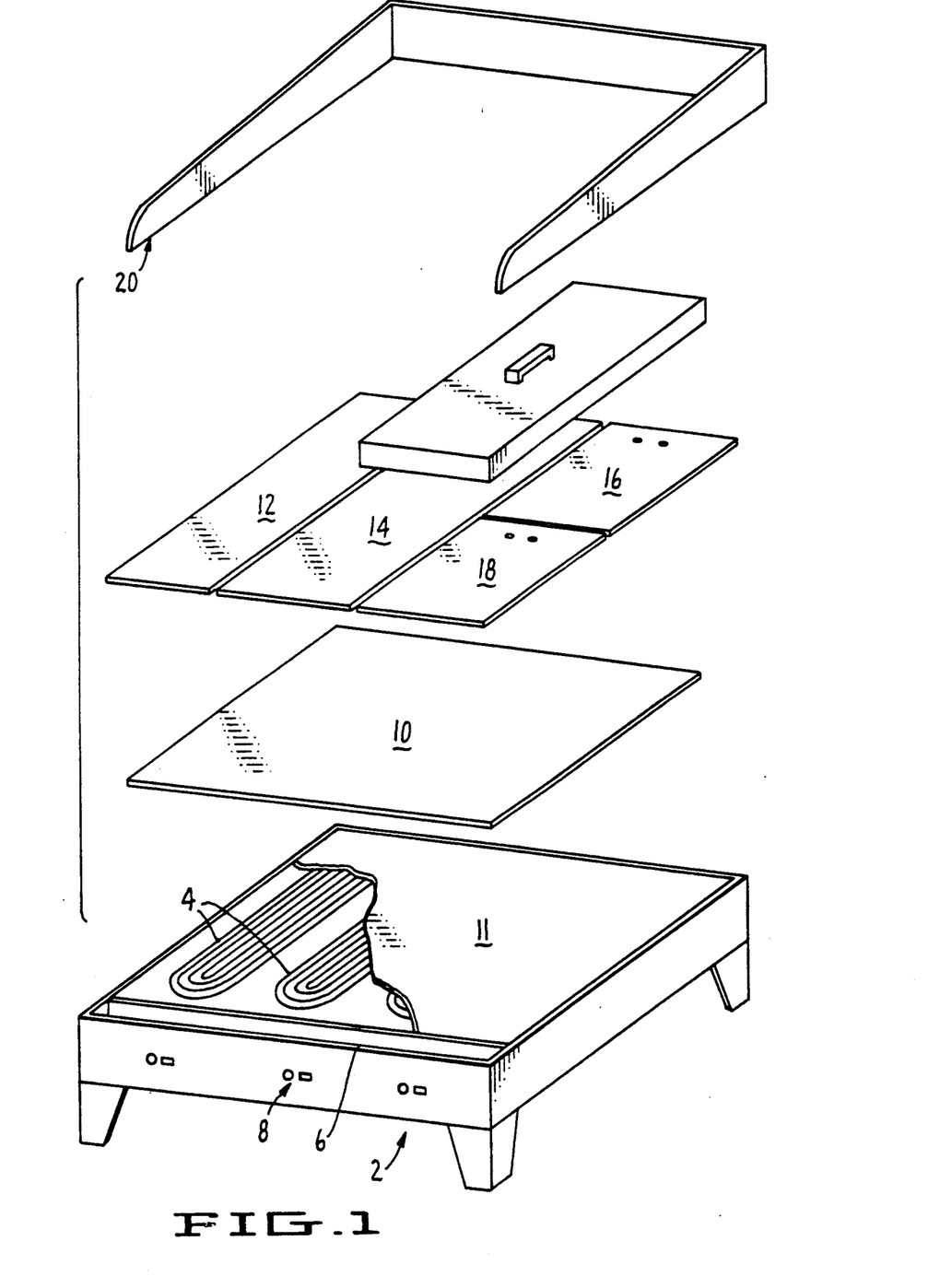
FIG. 1 is an exemplary embodiment of a griddle system in accordance with the present invention.

Referring specifically to FIG. 1 of the accompanying drawing, there is illustrated an exemplary griddle system of the present invention. The system comprises a stand 2 for supporting three induction coils 4 which are identical in construction. The stand has a grease trap 6 along its front horizontal surface and has controls 8 (one for each coil 4) on the front vertical surface.

Removably disposed over the coils 4 is a coil insulator 11 that serves several functions. The insulator 11 insulates the coil from extreme temperatures, minimizes heat loss from the griddle plates, and has sound absorption properties that help reduce noise which is often associated with magnetic induction systems. The insulator 11 is a refractory fiber blanket formed from very pure alumina, silica or other refractory oxides. For example, a preferred material used for insulator 11 is a non-woven glass.

Disposed above and in contact with the insulator 11 is a griddle surface 10 fabricated from glass or a lightweight, high-temperature polymer. The griddle surface 10 deflects grease into the grease trap 6 and prevents it from falling on the coils 4.

Disposed above and resting on the griddle surface 10 are removable griddle plates 12, 14, 16 and 18 which include high μ materials. Griddle plates of different Curie temperatures can be used concurrently. Thus, a griddle can include areas having several different, closely-controlled temperatures. Each griddle plate is fabricated to prevent unnecessary stray radiation. Further, by covering different regions of a griddle plate with different high μ materials, one plate can provide multiple temperatures. Thus, with only a few griddle plates, many different cooking temperatures can be provided.

In the FIG. 1 embodiment, all four of the plates shown can have the same Curie temperature, different temperatures, or any combination of the same or different temperatures, depending upon what foods are to be cooked on the plates. While only four plates are shown, it will be appreciated that any number of plates of virtually any size can be used.

As referenced herein, high μ materials or magnetically permeable materials provide a high degree of magnetic flux concentration as long as they are below their effective Curie temperatures. The term "effective Curie temperature" as used herein refers to the temperature at which a material becomes, for purposes of this invention, essentially non-magnetic. Such temperature can be as little as 1° C. or as much as 100° C. less than absolute Curie temperature, depending upon the material employed.

The flux concentrated in the high μ material produces eddy current and hysteresis losses as well as resistive losses. Such materials may be principally ferromagnetic or ferrimagnetic, but other materials whose degree of magnetic permeability varies with temperature can also be used.

To complete the structure, a removable splash guard 20 is disposed about the back and two sides of the top surface of the stand 2. In a preferred embodiment, a full-size griddle plate is about 1 foot by 2 feet.

The power supply (not illustrated) is held in the base of the stand 2 under the coils. It supplies 1300 watts per square foot of constant alternating current at 22 KHz or more, but preferably less than 50 KHz. An exemplary power work unit is a power supply taken from a Sanyo induction cooker Model No. 564.4498511. In a preferred embodiment, the power supply is controlled by the circuitry described below relative to FIG. 7.

Figure 2:
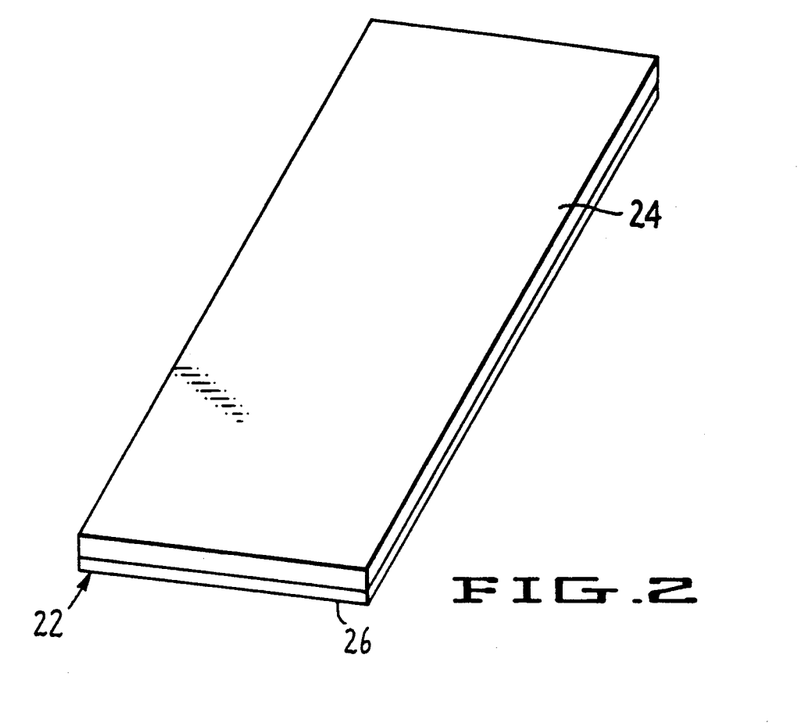
FIG. 2 is a perspective view of an exemplary embodiment of a griddle plate.

As previously indicated, the plates 12, 14, 16 and 18 are removable, and each one can have a different Curie temperature. Referring to FIG. 2, each plate 22 is quite thin and is made of a sheet 24 of stainless steel that is, for example, 0.125 inch thick with a bottom layer 26 of high μ material about 0.035 inch thick. The plates are easily cleaned. The use of an alloy layer that is 0.035 inch thick (about 5 skin depths) at 26 Khz permits the plate to accept all available power from the power unit and causes the plate to achieve its effective Curie temperature. Since the plates and the griddle surface 10 carry no electrical components they can be immersed in water for easy cleaning.

The thickness of the magnetic material on the griddle plates should be selected to take all of the energy from the coils that is available and essentially to isolate the surrounding area from the magnetic flux. With the aforesaid power supply frequency, the magnetic material on the plate as indicated above is 0.035 inch, this being approximately five skin depths at the frequency employed. See U.S. Pat. Nos. 4,256,945 and 4,701,587 which relate to skin depth and copper clad ferromagnetic materials, the disclosures of which are incorporated herein by reference.

Figure 3:
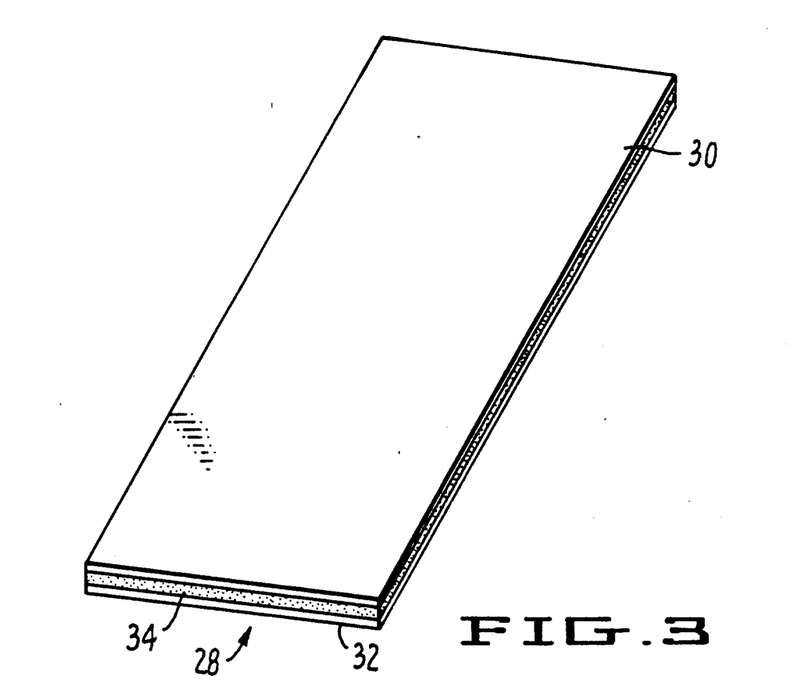
FIG. 3 is a perspective view of a tri-clad griddle plate.

In a preferred embodiment, a tri-clad plate 28 as shown in FIG. 3 is employed for each griddle plate. In an exemplary embodiment, an upper surface 30 is 304 stainless steel at 0.048 inch thickness, a bottom surface 32 is a nickel-iron, high μ material at a thickness of 0.035 inch, and sandwiched between is a Copper 101 plate 34 at a thickness of 0.075 inch. The total plate thickness is 0.153 inch, thus presenting little thermal inertia but providing adequate magnetic shielding.

The plate of FIG. 3 may have both lower and upper surfaces of high μ materials of different Curie temperatures. Thus each plate of FIG. 1 may be a tri-clad plate with two high μ surfaces to provide as many as eight cooking temperatures with four plates. The lower surface shields the upper surface from appreciable flux so that the lower magnetic surface controls the temperature. The number of griddle plates is determined by the number of different cooking temperatures desired. Although there are magnetic stainless steels, their Curie temperatures are quite high. Therefore, when a two-sided magnetic griddle plate is employed, both surfaces usually are iron-nickel alloys with approximated effective Curie temperatures as follows:

| Alloy | Effective Curie Temperature |
|-------|------------------------------|
| 31    | 75° C.                       |
| 31.5  | 100° C.                      |
| 32    | 128°-136° C.                 |
| 34    | 164° C.                      |
| 36    | 223°-250° C.                 |
| 42    | 325°-300° C.                 |

Other examples of tri-clad construction are Stainless 304, Copper 101 and selected Fe—Ni alloy and Stainless 400 series, Copper 101 and selected Fe—Ni alloy. The 400 series stainless provides increased shielding over the 304 series stainless. Also, two temperatures in one plate can be provided by a tri-clad construction including a selected Fe—Ni alloy, Copper 101 and another selected Fe—Ni alloy. A bi-clad plate can be formed with a stainless layer and a layer of a selected Fe—Ni alloy.

In a more preferred embodiment, the FIG. 3 tri-clad plate is formed with top and bottom layers of alloys having similar CTEs relative to the center layer. For example, the top layer can be a nonmagnetically permeable material with a low CTE relative to the center layer. Alternately, the top layer can be formed of a magnetically permeable material having a CTE lower than or equal to that of the bottom layer.

For example, the top cooking surface and/or the bottom surface of the griddle plate can be made with commercial Alloy 36 (Invar) with the top layer thickness being less than the thickness used for the heater alloy on the plate bottom. The thickness of the top alloy is selected to balance the bending moment of the bottom alloy (i.e., the heater alloy). Since the thermal expansion coefficient of the top layer material is lower than or equal to the thermal expansion coefficient of the bottom layer heater alloy, the top layer thickness is generally less than the bottom layer thickness.

This tri-clad composition can save significant material cost per plate for two general reasons. First, commercial grade Alloy 36 can be relatively inexpensive such that a cheaper alloy can be used for the top layer. Second, less material is required for the top layer.

Most common metals have a CTE in the range of 6 to $13 \times 10^{-6}$ per degree Fahrenheit. The only metals higher than this are lead, tin, and zinc. In a preferred embodiment, copper is used for the plate core and has a CTE of $9.8 \times 10^{-6}$ per degree Fahrenheit. Nickel-iron alloys are used for the heater element (i.e., bottom layer) and are in the range of 31.5 to 36 weight percent Ni. These alloys are well known low CTE metals. See, for example, "Low Expansion Alloys", ASM Metals Handbook, 9th Edition, Volume 3. For these alloys the average CTE from room temperature up to their Curie temperature has been plotted in FIG. 8.

Figure 8:
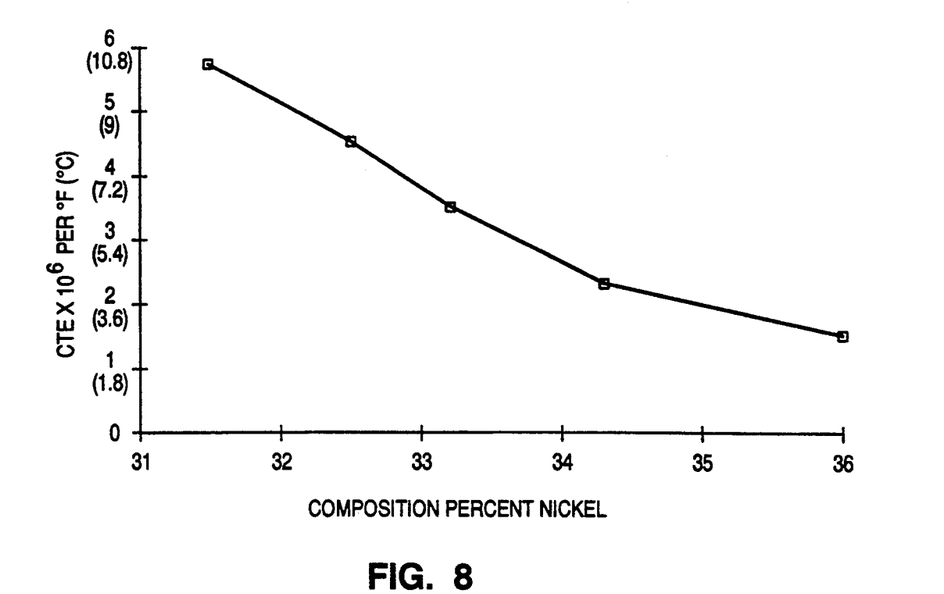
FIG. 8 is a graph showing the average CTE for various alloys used in a composite plate structure.

FIG. 8 reveals the low values of CTE compared to that of copper. It is for this reason that a two-layer plate "bows" substantially due to differential thermal expansion. Upon heating, the bottom layer expands much less than the copper core. Thus, the plate bows toward the heater side to form a concave surface. In accordance with a preferred embodiment of a planar griddle plate, the top layer is therefore selected as a low expansion layer (e.g., the same material as the bottom heater layer) to counterbalance the bending effect produced by the bottom heater layer. When chosen correctly, the top layer keeps the plate planar as the plate temperature cycles during use.

Alloy 36, also known as Invar, has the lowest CTE of the NiFe binary alloy system. At compositions above and below 36 weight percent Ni, the CTE rises to higher values. Therefore, Alloy 36 has the greatest ability to apply a bending moment to the composite plate. If Alloy 36 is selected as the top layer, then the thickness of the top layer needed to counterbalance the bending moment produced by other nickel-iron alloys used for the bottom layer is generally less than the thickness of the bottom layer.

The parameters used to describe various material layers are found in the following Table 1.

TABLE 1

| Material | Modulus ($\times 10^{-6}$ PSI) | CTE ($\times 10^{-6}$ per °F.) | Thickness (inches) |
|----------|-------------------------------|-------------------------------|--------------------|
| Copper   | 17   | 9.8 | 0.070 |
| Alloy 31.5 | 19.6 | 5.7 | 0.018 |
| Alloy 32.5 | 19.6 | 4.5 | 0.017 |
| Alloy 33.2 | 19.6 | 3.5 | 0.016 |
| Alloy 34.3 | 19.6 | 2.3 | 0.015 |
| Alloy 36   | 19.6 | 1.5 | 0.015 |

These values were used to identify a thickness of the top layer in a tri-clad plate which produced zero deflection when the heater layer (bottom layer) was formed from each of the five alloys listed in Table 1. These results are shown in the FIG. 9 graph.

Figure 9:
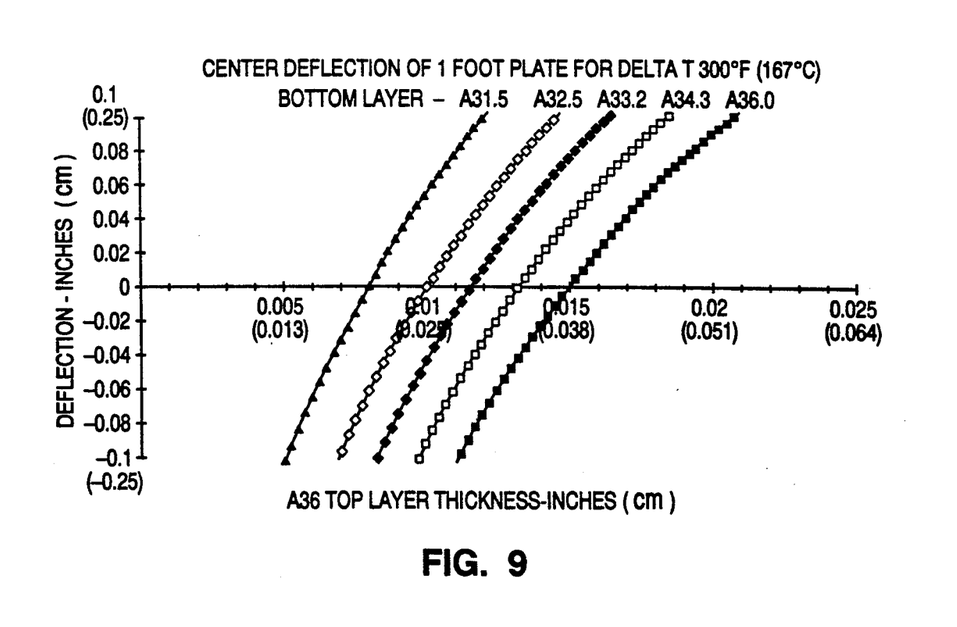
FIG. 9 graph showing layer thickness versus deflection for various alloys.

In FIG. 9, the abscissa is the thickness of the alloy required to produce the indicated deflection. The intersection of each curve with the abscissa corresponds to the thickness required to produce zero deflection, i.e., no bending.

Exemplary tri-clad plate compositions are listed in Table 2 below. For each plate, the thickness and weight of each layer are identified.

TABLE 2

| | EXEMPLARY PLATE | | | EXEMPLARY ALTERNATIVE | | |
|---|---|---|---|---|---|---|
| | BOTTOM | MIDDLE | TOP | BOTTOM | MIDDLE | TOP |
| MATERIAL | A34.3 | Cu | A34.3 | A34.3 | Cu | A36 |
| THICKNESS | 0.015 | 0.07 | 0.015 | 0.015 | 0.07 | 0.0135 |

TABLE 2-continued

| | EXEMPLARY PLATE | | | EXEMPLARY ALTERNATIVE | | |
|---|---|---|---|---|---|---|
| | BOTTOM | MIDDLE | TOP | BOTTOM | MIDDLE | TOP |
| WEIGHT (pounds) | 1.52775 | 7.9135 | 1.52776 | 1.52775 | 7.9135 | 1.374975 |
| MATERIAL | A33.2 | Cu | A33.2 | A33.2 | Cu | A36 |
| THICKNESS (inches) | 0.016 | 0.07 | 0.018 | 0.016 | 0.07 | 0.0115 |
| WEIGHT (pounds) | 1.6298 | 7.9136 | 1.6298 | 1.6298 | 7.9135 | 1.171275 |
| MATERIAL | A32.5 | Cu | A32.5 | A32.5 | Cu | A36 |
| THICKNESS (inches) | 0.017 | 0.07 | 0.017 | 0.017 | 0.07 | 0.01 |
| WEIGHT (pounds) | 1.73145 | 7.0136 | 1.73145 | 1.73145 | 7.0136 | 1.0185 |
| MATERIAL | A31.5 | Cu | A31.5 | A31.5 | Cu | A36 |
| THICKNESS (inches) | 0.018 | 0.07 | 0.018 | 0.018 | 0.070 | 0.0076 |
| WEIGHT (pounds) | 1.8283 | 7.0185 | 1.4283 | 1.8283 | 7.0185 | 0.763475 |

In accordance with preferred embodiments, the use of commercial grade Alloy 36 for the top layer can provide significant reductions in cost. However, it will be apparent to those skilled in the art that the exact amount of the cost reduction depends upon the particular heater alloy selected for the bottom layer, as this will dictate the thickness necessary for the top layer.

Figure 4:
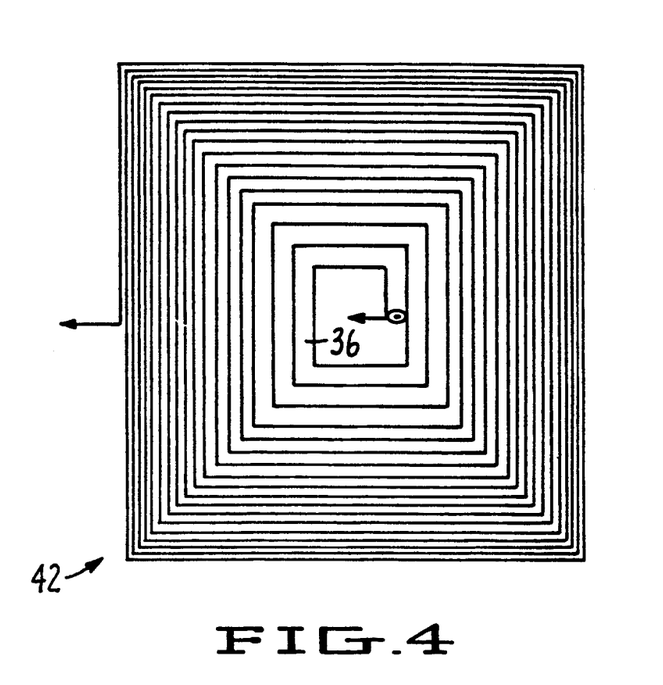
FIG. 4 is a detailed view of an exemplary coil configuration in accordance with the present invention.

Referring now to FIG. 4 of the accompanying drawing, there is illustrated an exemplary coil structure for use in the present invention. Coil 42 is fabricated from commercial grade Alloy 36 (Litz wire) and non-conductive rubber or plastic spacing material 38. In order to obtain a magnetic field that maintains a uniform temperature across the griddle plate surface, the spacing between the turns of the Litz wire are nonuniform with a range of spacing from 0.25 inch in the center of the coil to zero at the edges.

In a preferred embodiment, the Litz wire is 0.10 inch in diameter. The coil length is 37 feet 10 inches with the first two feet having a spacing of 0.25 inch between turns, the next 27 feet having 0.125 inch between turns, the next five feet having 0.103 inch between turns, and the last three feet 10 inches having no spacing between turns except for the insulation over the wire.

Figure 5:
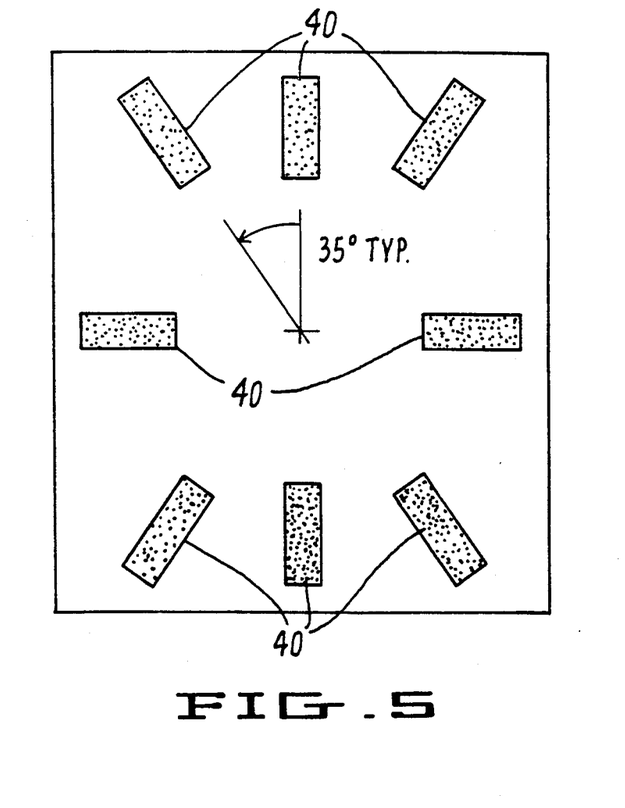
FIG. 5 is a view illustrating an exemplary arrangement of various ferrite bars under the coil structure.

To assist in producing the uniform heating in one specific embodiment, ferrite bars 40 are located, as illustrated in FIG. 5, below the coils 42. The coils are rectangular in shape, eleven inches by ten inches. Each coil has associated with it 8 ferrite bars, approximately 2.5 inches long, 0.75 inch wide, and 0.0187 inch thick. The bars 40 are located at each end of the horizontal and vertical center lines of the rectangle and at each end of two lines at approximately 35° on both sides of the vertical center line, as illustrated in FIG. 5.

The purpose of these bars 40 is two-fold. First, the bars both reduce the flux concentration under the coil 42 and increase the flux concentration over the coil to increase the flux coupling to the magnetic material. By reducing the flux under the coils, the bars assist in preventing leakage of electromagnetic radiation. A second use of the bars is to assist the coil structure in providing uniform temperature across a griddle plate. In most prior art griddles, it is assumed that application of heat must be heavily concentrated about the edges because there is no heat source outside the edges of the griddle whereas the center of the griddle is surrounded by heated material.

It has been found, however, that the above assumption is not totally accurate and that the center of the griddle is cooler than the rest of the surface. Thus, in accordance with the present invention, a small part of the coil is devoted to heating the center section of the griddle. The increased magnetic flux produced at the edges due to the ferrite bars compensates for the loss of flux diverted to the lateral central region of the griddle plate. As previously indicated, the variation in temperature across the griddle is ±10° F. to within 0.5 inch of its edges.

Figures 6, 7:
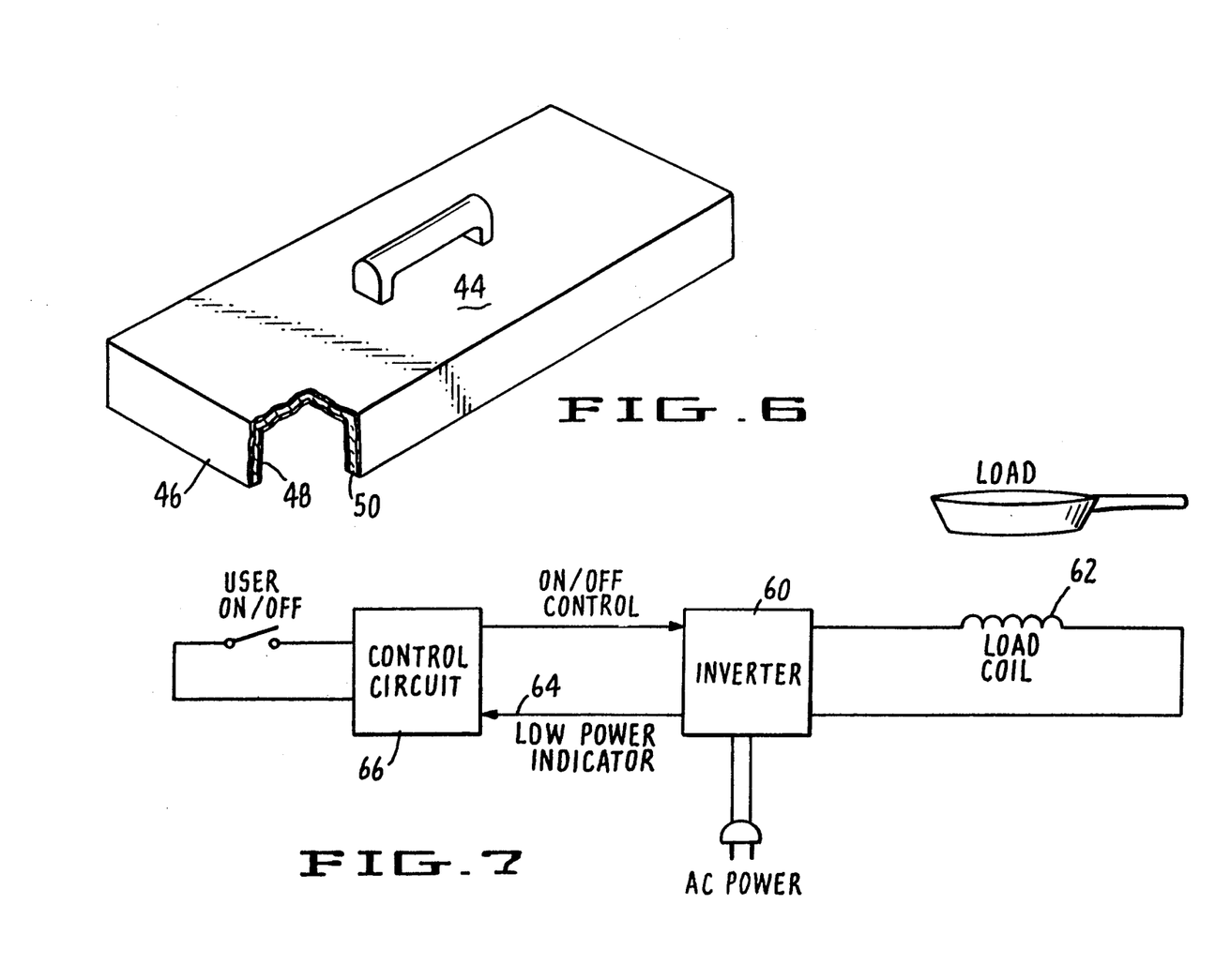
FIG. 6 is a view in cross-section of a cover for the griddle plates.
FIG. 7 is a diagram of an exemplary control circuit employed in accordance with the present invention.

Referring now to FIG. 6 of the accompanying drawings, there is illustrated in partial cross-section a cover 44 that can be used with the griddle system of the present invention. The cover 44 has inner and outer layers 46 and 48, both fabricated from a heat resistant, poor heat conducting material and is a hollow structure. The outer materials used may be a liquid crystal polymer or stainless steel. Central region 50 of the cover 44 may be empty or may have a poor heat conducting fibrous filler of glass wool or ceramic.

When placed on a griddle plate such as griddle triclad plate 28 of FIG. 3, the surface of the plate is reasonably isolated from the ambient air, and loss of heat is maintained at a quite low range. The plate does not overheat because its temperature will not rise above its effective Curie temperature. Thus, the temperature of the tri-clad plate 28 cycles slowly about its effective Curie temperature, expending little energy. A further feature that enhances the efficiency of the apparatus is the insulator 11. The insulator 11, as described above, reduces heat loss at all times. When the cover 44 is used in conjunction with the insulator, the covered griddle plate is greatly isolated from the ambient, and effective Curie temperature is maintained with relatively little expenditure of energy.

Operation of the griddle system in accordance with the present invention will now be described. Generally speaking, if the griddle plate employs different Curie temperatures on opposite surfaces, the operation is similar to that disclosed in U.S. Pat. No. 4,695,713 which relates to an autoregulating, electrically shielded heater for a soldering iron tip. If a non-magnetic, low-resistance layer, such as copper, is disposed between two ferromagnetic surfaces, operation is similar to that described in U.S. Pat. No. 4,752,673 which also relates to an autoregulating soldering iron tip. Shielding can be provided in a manner similar to that described in U.S.

Pat. No. 4,701,587. The teachings of these patents are incorporated herein by reference.

Referring specifically to FIG. 7 of the accompanying drawing, there is illustrated in block diagram a control circuit for the aforementioned Sanyo induction cooker power work unit. The unit includes the Sanyo inverter 60 feeding the griddle coil 62 of the present invention. The inverter 60 feeds a low power signal over lead 64 to a control circuit 66 which, in turn, supplies an on/off signal to the inverter 60.

In a preferred embodiment, the induction coils are supplied with a constant alternating current to maintain uniform response to the energy input. The more uniform the current, the better the temperature regulation. For the sake of analysis, the griddle plates are considered to reflect resistance into the coils, and under these circumstances, the regulation is governed by the equation:

$$\frac{\Delta |I|}{|I|} < -\frac{1}{2} \frac{\Delta R}{R}$$

where $|I|$ is the current and R is the reflected resistance. If the current is held constant, regulation is good. If the current is permitted to rise, the regulation becomes poorer as the value of the left side of the equation approaches the right side. The system fails if the value of the left side of the equation exceeds the value of the right side.

The purpose of the control is two-fold. First, the control makes full power available to the coil if a griddle plate is present. Second, the control provides low level pulses to the coil if the griddle plate is not present or if a light load is present (e.g., a pan or other small cooking vessel or utensil). Specifically, if the power being supplied to the load by inverter 60 indicates that a griddle plate is present, the inverter 60 delivers some power all the time, the level depending upon the load. If the griddle plate is not present, a low power indication is supplied to control circuit 66 which goes into a low duty cycle pulsing mode causing the delivery of only small amounts of power to the coil 62. If a griddle plate is replaced, the power absorbed rises above a predetermined threshold, and the full power is once more available.

In addition, a thermal switch (not illustrated) is located adjacent a griddle plate to sense coil temperature. Overheating can occur if the power supply allows the current to rise after effective Curie temperature is achieved. If the value of the left side of the aforementioned equation exceeds the value of the right side, a run-away condition can occur. The temperature sensing switch would shut the system down in such an event.

A griddle plate takes about five minutes to reach maximum temperature from a cold start. This maximum temperature can be maintained at little cost of energy if a cover, as previously described, is placed over all areas not being used. Heat loss is minimized particularly if a poor heat conductive material is employed for the cover or covers. Further, the aforementioned insulating pad can be disposed between the coils and the griddle plates to, among other things, reduce heat loss from the griddle plates. The combination of these two features provides an unusually efficient system with the insulating pad reducing heat loss at all times and the cover reducing heat loss during non-cooking intervals.

Other improvements, modifications and embodiments will become apparent to one of ordinary skill in the art upon review of this disclosure. Such improvements, modifications and embodiments are considered to be within the scope of this invention as defined by the following claims.

What is claimed is:

1. A system for providing a surface adapted to be heated to a predetermined temperature for cooking food, comprising:
    an induction coil for generating a magnetic field; and
    a planar griddle plate positioned adjacent the induction coil, said griddle plate further including:
        first and second layers, at least one of said layers being formed of magnetically permeable material having a particular Curie temperature, said first and second layers having predetermined coefficients of thermal expansion; and
        a third layer of material placed between said first and second layers and having a coefficient of thermal expansion substantially higher than said predetermined coefficients of thermal expansion of the first and second layers, said first, second and third layers having relative thicknesses which maintain said griddle plate planar during heating o said magnetically permeable material to its Curie temperature.

2. A system according to claim 1, wherein said magnetically permeable material is a nickel-iron alloy and said third layer is formed of copper.

3. A system according to claim 1, wherein said first layer represents a cooking surface and is formed with a thickness less than said second layer.

4. System according to claim 1, wherein said first and second layers are formed of the same magnetically permeable material and have the same coefficient of thermal expansion.

5. System according to claim 1, wherein said second layer is located closer to said induction coil than said first layer, said first layer having a coefficient of thermal expansion of which is less than the coefficient of thermal expansion of the second layer.

6. System according to claim 1, wherein said second layer is located closer to said induction coil than said first layer, said first layer being formed with said magnetically permeable material and having a thickness of approximately .015 inches.

7. System according to claim 6, wherein said first and second layers are formed of the same magnetically permeable material and have the same coefficient of thermal expansion.

8. A system according to claim 7, wherein said magnetically permeable material is a nickel-iron alloy and said third layer is formed of copper.

9. A three-layer composite griddle plate for use as a planar cooking surface comprising:
    first and second planar layers at least one of said first and second layers being formed of a magnetically permeable material having a Curie temperature, said first and second layers having predetermined coefficients of thermal expansion; and
    a third layer located between said first and second layers, said third layer formed of a material having a coefficient of thermal expansion different from said predetermined coefficients of thermal expansion of said first and second layers, each of said first, second and third layers having relative thicknesses selected to prevent the composite griddle plate from bending when said first layer is heated to its Curie temperature.

10. A griddle plate according to claim 9, wherein said magnetically permeable material is nickel-iron alloy and said third layer is formed of copper.

11. A griddle plate according to claim 9, wherein said first layer represents a cooking surface and is formed with a thickness less than said second layer.

12. A griddle plate according to claim 9, wherein said first and second layers are formed of the same magnetically permeable material and have the same coefficient of thermal expansion.

13. A griddle plate according to claim 9, wherein said second layer is located closer to said induction coil than said first layer, said first layer having a coefficient of thermal expansion which is less than the coefficient of thermal expansion of the second layer.

14. A griddle plate according to claim 9, wherein said second layer is located closer to said induction coil than said first layer, said first layer being formed with said magnetically permeable material and having a thickness of approximately 0.015 inches.

15. A griddle plate according to claim 14, wherein said first and second layers are formed of the same magnetically permeable material and have the same coefficient of thermal expansion.

16. A griddle plate according to claim 15, wherein said magnetically permeable material is a nickel-iron alloy and said third layer is formed of copper.

17. A method for fabricating a three-layer composite griddle plate for use as a planar cooking surface comprising the steps of:
   selecting at least one magnetically permeable material having a Curie temperature for use as at least one of a first and second layer of the planar griddle plate, said first and second layers having predetermined coefficients of thermal expansion;
   selecting another material for use as a third layer located between said first and second layers of the planar griddle plate, said another material having a coefficient of thermal expansion different from said predetermined coefficients of thermal expansion of said first and second layers; and
   selecting relative thicknesses of said first, second and third layers which prevent said composite griddle plate from bending when said first layer is heated to its Curie temperature.

18. Method according to claim 17, further comprising the step of:
   selecting a single magnetically permeable material for use as said first and second layers.

19. Method according to claim 18, wherein a nickel-iron alloy is selected as said magnetically permeable material and copper is selected as said another material.

20. Method according to claim 17, further comprising the step of:
   selecting said first layer as a magnetically permeable material having thickness less than that of said second layer.

* * * * *

UNITED STATES PATENT AND TRADEMARK OFFICE
CERTIFICATE OF CORRECTION

PATENT NO. : 5,227,597
DATED : July 13, 1993
INVENTOR(S) : David Dickens et al.

It is certified that error appears in the above-indentified patent and that said Letters Patent is hereby corrected as shown below:

Column 10, line 24, before "griddle" insert --Planar --. after "Plate" delete -- Planar --.
Column 10, line 25, delete "o" and add --of--.

Signed and Sealed this

Twelfth Day of April, 1994

BRUCE LEHMAN

Attest:

Attesting Officer

Commissioner of Patents and Trademarks